United States Patent [19]
Weingart

[11] Patent Number: 4,611,488
[45] Date of Patent: Sep. 16, 1986

[54] APPARATUS FOR CLEARING THE LINE OF A MARINE SPEEDOMETER WITH PRESSURIZED GAS

[76] Inventor: Mark H. Weingart, 1525 Streets Boro, Plaza, Ohio 44240

[21] Appl. No.: 728,388

[22] Filed: Apr. 29, 1985

[51] Int. Cl.$^4$ .......................... G01C 21/10; G01F 1/46
[52] U.S. Cl. .................................... 73/182; 73/861.65
[58] Field of Search ................ 73/182, 861.65, 861.66, 73/861.67, 861.68

[56] References Cited

U.S. PATENT DOCUMENTS

| | | | |
|---|---|---|---|
| 3,349,615 | 10/1967 | Finkl | 73/182 |
| 3,380,298 | 4/1968 | Hanson | 73/861.65 |
| 4,498,347 | 2/1985 | Grantham | 73/861.67 |

Primary Examiner—Donald O. Woodiel
Attorney, Agent, or Firm—Fay, Sharpe, Fagan, Minnich & McKee

[57] ABSTRACT

The invention relates essentially to an apparatus for clearing the line of a marine speedometer with pressurized gas, wherein the invention connects a source of pressurized gas through a three-way valve to a diverter valve between the boat's speedometer readout and the pitot tube to allow a source of gas to pass through the three-way valve, and the diverter valve, out the pitot tube in the reverse direction, and thus clear particles therefrom. When the source of pressurized gas is turned off, the pitot tube will operate in the usual manner and the pressure of the moving boat will force air up to the diverter valve, thus closing the diaphragm of the valve and activating the speedometer to read accurately.

3 Claims, 2 Drawing Figures

APPARATUS FOR CLEARING THE LINE OF A MARINE SPEEDOMETER WITH PRESSURIZED GAS

BACKGROUND OF THE INVENTION

Speedometers have been used on all types of boats for a long period of time. Speedometers serve a very important function particularly, for example, when a boat is being used for skiing because skiers are very sensitive to a change of boat speed. As a result, it is necessary to clear the pitot tube of a boat speedometer quite frequently so there may be accurate readings taken. If the speedometer should become clogged so that the driver of the boat cannot take an accurate reading, mishaps may occur, one of which can result in a skier's falling.

This invention is particularly directed to the use of pressurized gas and a series of valves to clear the pitot tube of a marine speedometer.

The known prior art consists of the following:

| Patent No. | Inventor |
| --- | --- |
| 3,349,615 | Finkl |
| 3,380,298 | Hanson |

Finkl ('615) shows a water-pressure operated boat speedometer which is supplied with a source of gas 26 which can be pressurized. Gas is introduced in the speedometer to force the water from the line and prevent corrosion and clogging. The tubes are maintained gas-filled at all times during the operation of the speedometer.

Hanson ('298) shows a device for purging the static and total pressure lines of a pitot tube. A compressor or other source of compressed gas is used to periodically purge the lines with a blast of high pressure gas. The valves are used to isolate the gauges from the high pressure source during the purge cycle. During the read cycle, the same valves isolate the high pressure source from the gauge and pitot tube lines.

DESCRIPTION OF THE PREFERRED EMBODIMENTS

In the use of a skiboat or speedboat, it is important that an operator be trained to give skiers the best advantage for the type of waterskiing that they choose. It is important for skiers to know exactly how fast the boat is traveling, whether for competitive or recreational skiing. Frequently, clogged particles will block the pitot tube of a speedometer and the speedometer then renders an incorrect reading. As a result, a purge system for a speedometer is required, but none has been found to be practicable to date.

Figure 2:
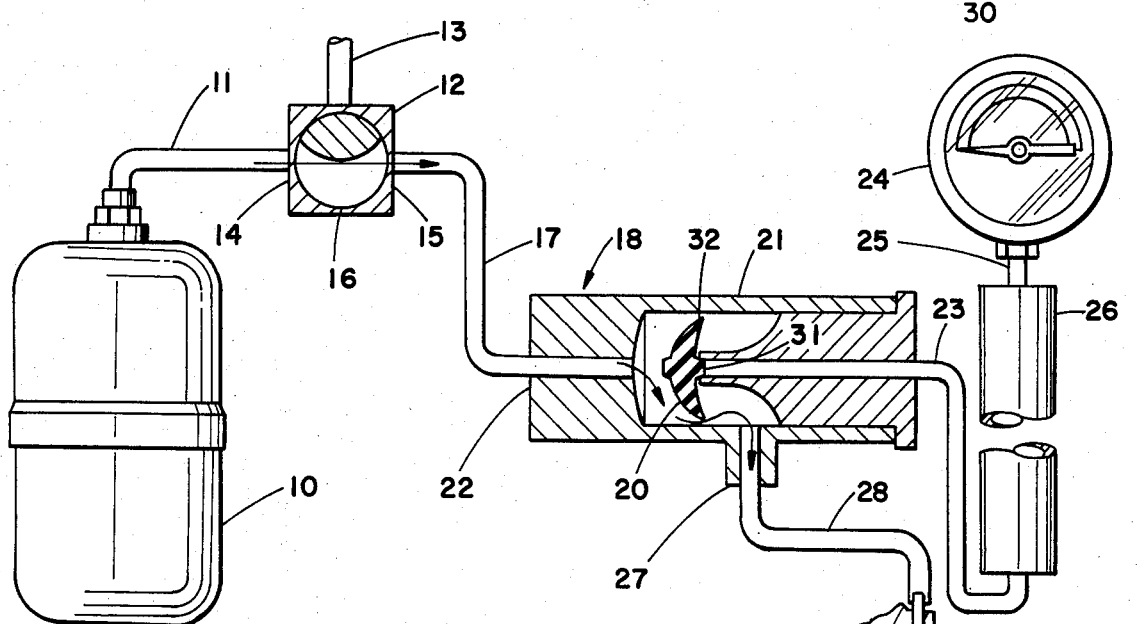
FIG. 2 is a schematic diagram of the system where the pressurized gas or purge is clearing the pitot tube of the speedometer.

This invention consists of a source of pressurized gas 10, having a connection tube 11 to a three-way valve 12, having an exhaust port 13 and a port to the source of pressurized gas 14, and a further port 15 to the diverter valve 18. Within the valve there is a rotating member 16 which rotates from a position to cover the source of pressurized gas. In a position as seen in FIG. 2, it covers the exhaust port 13. A further tube 17 leads to the diverter valve shown at 18. This diverter valve is known as a Clippard pneumatic unit. Valve 18 is a diverter valve of the diaphragm type, having a neoprene diaphragm 20 and a body 21 having an entrance connection 22 for the source of pressurized gas against one face of the diaphragm, and a body portion having a further exit for gas to the speedometer which is shown at 23. The speedometer itself is shown at 24 with a connection thereto at 25. An accumulator 26 is in the line between the speedometer 24 and the diverter 21. A third port for this diverter valve may be seen at 27, leading to tube 28 and to pitot tube 29, which is immersed in the water. When the boat is traveling in a forward direction, water and air will flow up pitot tube 29, through tube 28, and pass out through opening 23 into the accumulator 26 and through tube 25 to the speedometer 24 and will register the boat's speed on the speedometer.

Figure 1:
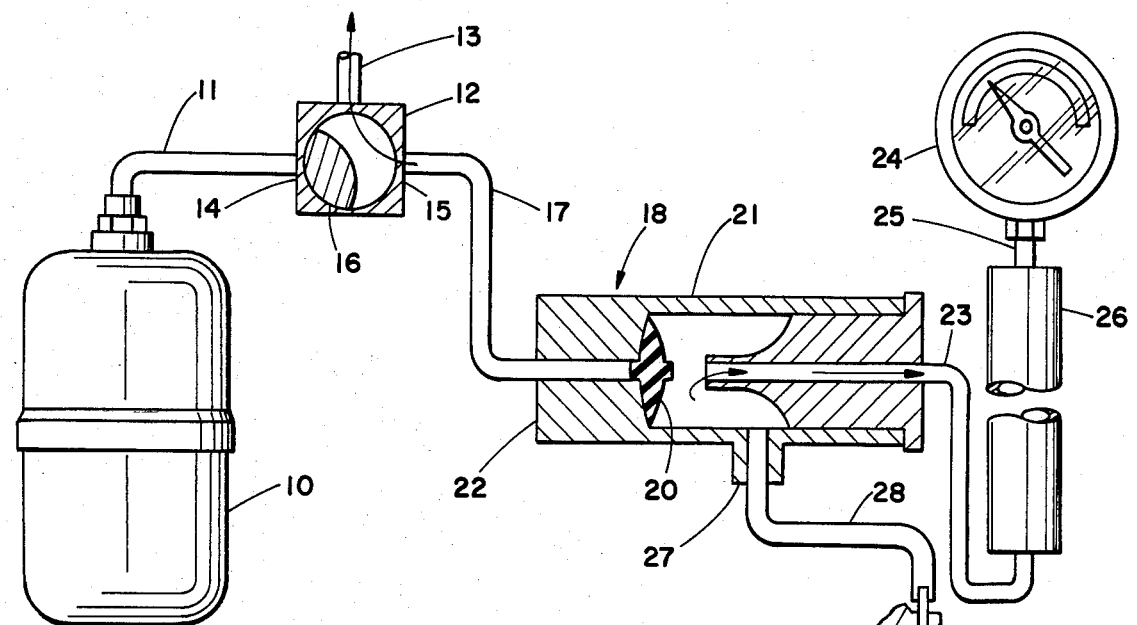
FIG. 1 is a schematic diagram of the speedometer and pressurized gas purge system where the speedometer is operating under normal conditions.

When it is necessary to clear out the pitot tube, the three-way valve is rotated to close exhaust port 13. Pressurized gas passes through the tube 11, down through the tube 17, and forces the neoprene seal 20 to the right. Air can then pass on either side of it out through port 27, through tube 28, and out through pitot tube 29 and through its exit port which is seen at 30. After a blast of air has forced the diverter valve 18 to the right, and allowed air to pass out through the pitot tube, obstructions that occur in pitot tube 29 will pass out through the port 30. After a blast of air, the three-way valve 12 may be returned to its original position, as shown in FIG. 1, covering orifice 14 so that the pressurized gas will remain in the can. Now, as the forward direction of the boat returns, the speedometer will register the speed of the boat from the air and water that are passing up through tube 28 and through the diverter valve 18 to the accumulator 26 and to the speedometer 24.

The operation of this pressurized gas is particularly sensitive in that as the air passes down tube 17 and against the neoprene diaphragm 20, it closes off the opening 23, but there will be a rush of air against the left side of the neoprene gasket forcing it to the right and then the ends of the diaphragm, unsupported, will bend and allow the escape of air around the sides out through opening 27 to the pitot tube 29. Meanwhile, a projection 31 on the diaphragm will cover the opening shown as 32.

Any water that is in the accumulator 26 will remain and the speedometer will register correctly immediately after clearing. There is no delay. This is important in competitive skiing in debris filled lakes where dirt or leaves clog the pilot tube on occasion.

Damage might occur to the speedometer if a rush of air should pass out through opening 32, through port 23, and out through tube 25 directly to the speedometer. The diverter valve provides the protection. With this particular invention, the speedometer is protected, and upon closing of the three-way valve 12, and the resumption of the operation of the speedometer, the air passing through tube 28 will extend on all faces of the diaphragm 20, forcing it to return to its original position shown in FIG. 1 against the opening, thus allowing the air and water to activate the speedometer and render an accurate reading of the boat's speed.

The accumulator 26 could be placed in line 28 but the response time is much slower to refill the accumulator before a correct reading is registered.

Although the invention has been shown and described with respect to certain preferred embodiments, it is obvious that equivalent alterations and modifications will occur to others skilled in the art upon the reading and understanding of this specification. The present application covers all such equivalent alterations and modifications, and is limited only by the scope of the appended claims.

What is claimed is:

1. An apparatus for clearing the line of a marine speedometer with pressurized gas comprising the following:
   (a) a speedometer readout of the pitot tube type;
   (b) a pitot tube interconnected with said speedometer readout;
   (c) a diverter valve including a diaphragm having a connection between said speedometer readout and said pitot tube;
   (d) a source of pressurized gas; and
   (e) a three way valve between said source of pressurized gas and diverter valve, having an exhaust port in the connection from the source of gas to the diverter valve,
   whereby the pressurized gas may be connected through the diverter valve into the pitot tube to clear the tube from obstructions; upon turning off the pressurized gas diverter valve will normally recover, because of the design of the diaphragm, to activate the speedometer readout.

2. The apparatus of claim 1 in which the three way valve is a rotary valve with the exhaust port being one port in the valve.

3. The apparatus of claim 1 in which the diverter valve is of the pneumatic type with the diaphragm moving to close opposite the positional ports cutting off air to the readout and, on closing of the pressurized gas three way valve, cutting off the port the the three way valve.

* * * * *